United States Patent
Veno

(10) Patent No.: US 6,955,319 B1
(45) Date of Patent: Oct. 18, 2005

(54) TAPE CARTRIDGE WITH ACCESS DOOR

(75) Inventor: William T. Veno, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 39 days.

(21) Appl. No.: 10/738,770

(22) Filed: Dec. 17, 2003

(51) Int. Cl.[7] ............................................. G11B 23/107
(52) U.S. Cl. ...................................... 242/348; 360/132
(58) Field of Search ............................ 242/347, 347.1, 242/347.2, 348, 348.2; 360/83, 85, 93, 132, 360/133; 369/291

(56) References Cited

U.S. PATENT DOCUMENTS

| | | | | |
|---|---|---|---|---|
| 3,861,611 A | * | 1/1975 | Esashi et al. ................ | 242/347 |
| 4,045,821 A | * | 8/1977 | Fujikura ...................... | 360/132 |
| 4,320,430 A | * | 3/1982 | Vogt ............................. | 360/133 |
| 4,399,480 A | * | 8/1983 | Edwards ...................... | 360/132 |
| 4,559,575 A | * | 12/1985 | Noto et al. .................. | 360/133 |
| 4,572,460 A | | 2/1986 | Hertrich | |
| 5,868,333 A | * | 2/1999 | Nayak ...................... | 242/348.2 |
| 6,003,802 A | | 12/1999 | Eaton et al. | |
| 6,023,398 A | * | 2/2000 | Tannert et al. .............. | 360/133 |
| 6,445,539 B1 | | 9/2002 | Morita et al. | |
| 6,565,028 B2 | | 5/2003 | Sasaki et al. | |
| 6,581,865 B1 | * | 6/2003 | Zweighaft et al. .......... | 242/348 |
| 6,764,037 B2 | * | 7/2004 | Hancock et al. ............ | 242/348 |
| 6,827,307 B2 | * | 12/2004 | Hiraguchi et al. ....... | 242/348.2 |

\* cited by examiner

*Primary Examiner*—William A. Rivera
(74) *Attorney, Agent, or Firm*—Brooks Kushman P.C.

(57) ABSTRACT

A tape cartridge, for use with a tape drive having an actuation member, includes a cartridge body and a door movably associated with the cartridge body. The cartridge further includes a retractor member having a first portion attached to the door and a second portion attached to the cartridge body such that the second portion is pivotable with respect to the cartridge body. The retractor member is configured to engage the actuation member of the tape drive and to move the door toward an open position when the cartridge body is inserted into the tape drive.

22 Claims, 2 Drawing Sheets

TAPE CARTRIDGE WITH ACCESS DOOR

BACKGROUND OF THE INVENTION

1. Field of the Invention

The invention relates to a tape cartridge for use with a tape drive and having an access door.

2. Background Art

A tape cartridge typically includes magnetic tape wound on a supply reel. Data is read from or written to the tape by inserting the cartridge into a tape drive that includes a read/write head. The cartridge may also include an access door to protect the tape from damage. When the cartridge is inserted into the drive, the door is opened to expose the tape to the drive interior.

SUMMARY OF THE INVENTION

Under the invention, a tape cartridge for use with a tape drive having an actuation member is provided. The cartridge includes a cartridge body, a door movably associated with the cartridge body, and a retractor member having a first portion attached to the door and a second portion attached to the cartridge body such that the second portion is pivotable with respect to the cartridge body. The retractor member is configured to engage the actuation member of the tape drive and to move the door toward an open position when the cartridge body is inserted into the tape drive.

Further under the invention, a tape cartridge, for use with a tape drive having an actuation member, includes a cartridge body having a first face with first and second openings. The first opening is configured to allow tape to pass therethrough. The second opening is configured to receive the actuation member of the tape drive when the cartridge body is inserted into the tape drive. The cartridge further includes a first door slidably associated with the cartridge body, a second door pivotably associated with the cartridge body, and a flexible member attached to the first and second doors. The first door is movable between an open position and a closed position in which the first door at least partially covers the first opening. The second door is pivotable between an open position and a closed position in which the second door at least partially covers the second opening. Furthermore, the second door is configured to engage the actuation member and to pivot with respect to the cartridge body when the cartridge body is inserted into the tape drive, thereby causing the first door to move toward the open position.

Still further under the invention, a tape cartridge, for use with a tape drive having an actuation member, includes a cartridge body, a door movably associated with the cartridge body, and a retractor member attached to the door and the cartridge body at an attachment location on the cartridge body. The retractor member is configured to engage the actuation member of the tape drive at a location between the door and the attachment location when the cartridge body is inserted into the tape drive. Furthermore, the retractor member is configured to move the door toward an open position upon engagement with the actuation member.

A tape cartridge and tape drive combination according to the invention comprises a tape cartridge and a tape drive configured to receive the cartridge. The cartridge includes a cartridge body, a door movably associated with the cartridge body, and a retractor member having a first portion attached to the door and a second portion attached to the cartridge body such that the second portion is pivotable with respect to the cartridge body. The tape drive includes an actuation member that engages the second portion of the retractor member when the tape cartridge is inserted into the tape drive. The second portion of the retractor member is configured to pivot upon engagement with the actuation member, thereby moving the door toward an open position.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
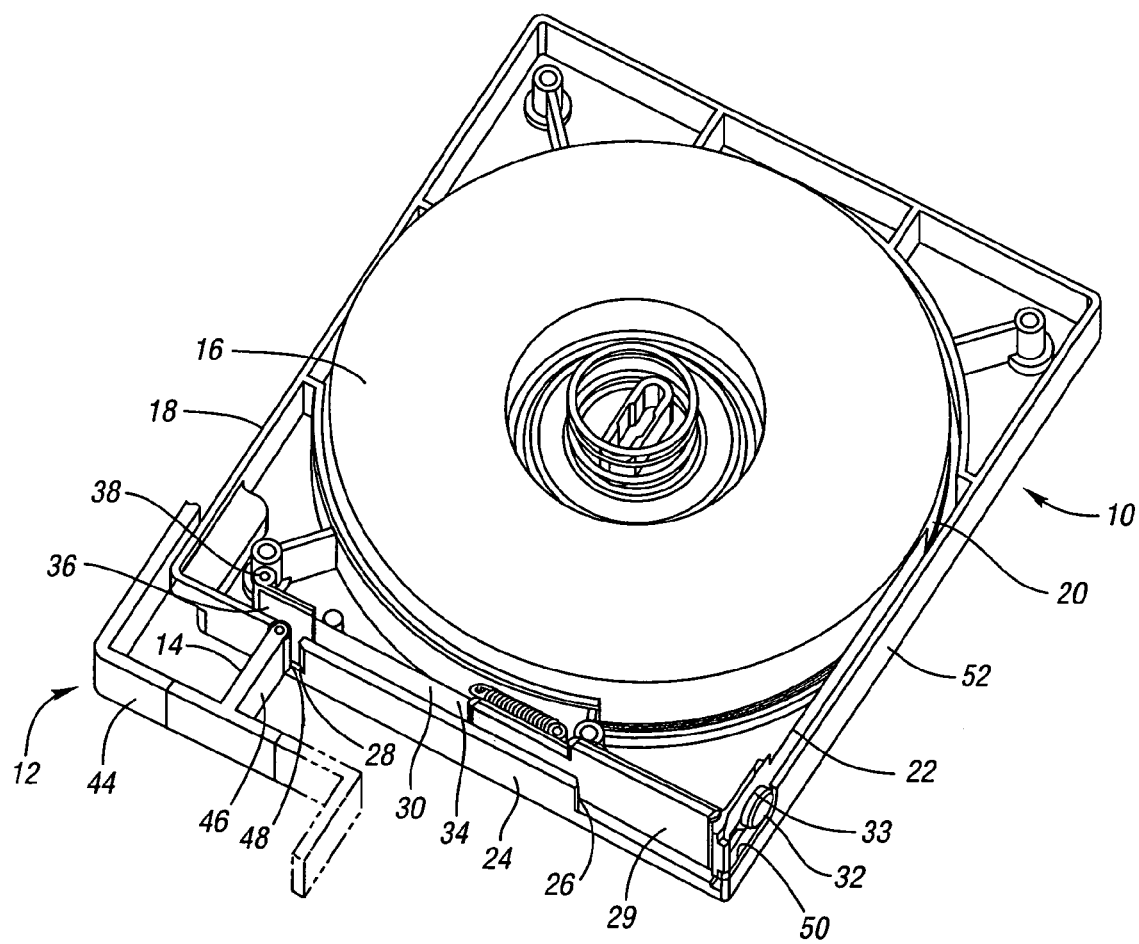
FIG. 1 is a front perspective view of a tape cartridge according to the invention, along with a fragmentary perspective view of a tape drive configured to receive the cartridge.

FIG. 1 shows a tape cartridge 10 according to the invention for use with a tape drive 12 having an actuation member 14. The cartridge 10 includes a supply reel 16 rotatably mounted on a cartridge body 18. A length of magnetic tape 20 is wound on the supply reel 16, and a leader 22 is attached to a free end of the tape 20.

Figure 2:
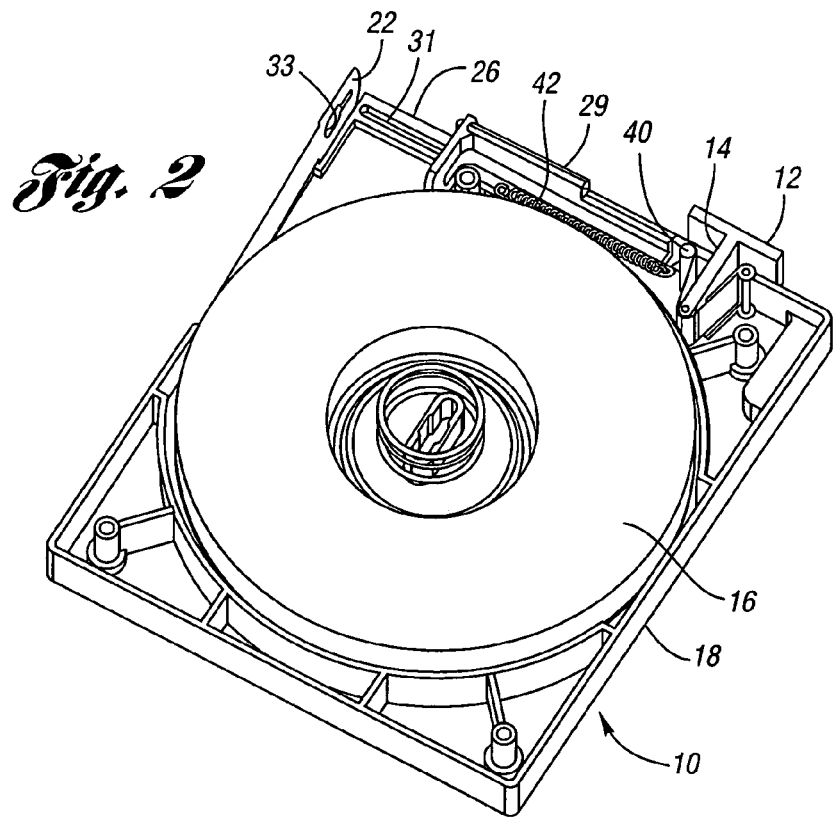
FIG. 2 is a rear perspective view of the cartridge showing the cartridge engaged with an actuation member of the tape drive.
Figure 3:
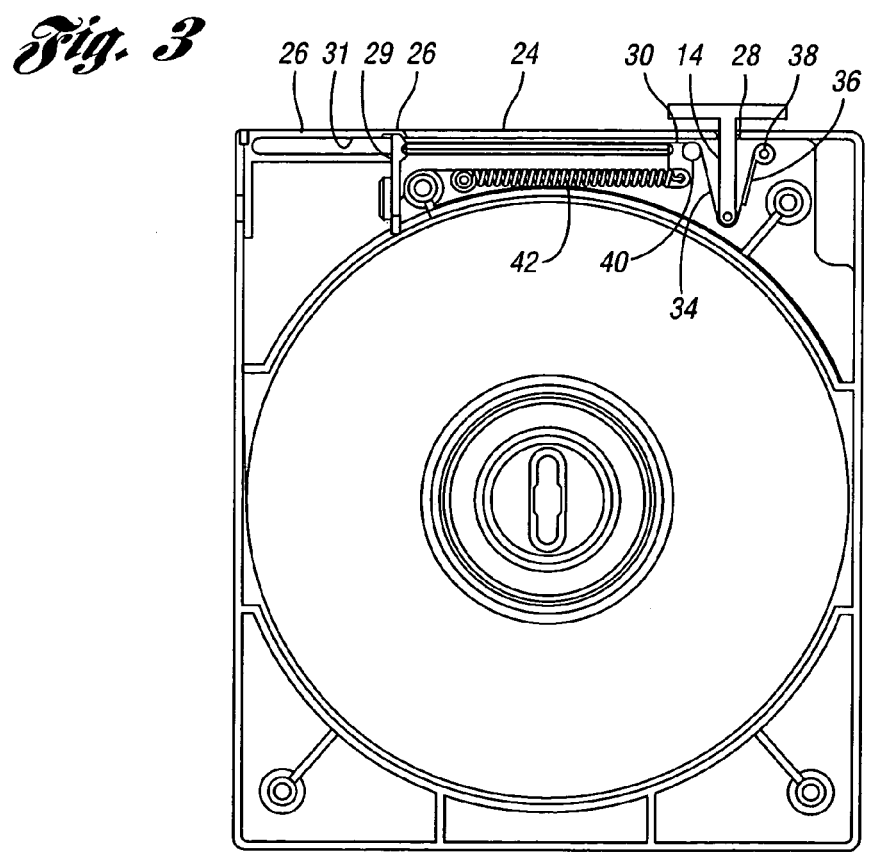
FIG. 3 is a top view of the cartridge showing the cartridge engaged with the actuation member.

Referring to FIGS. 1–3, the cartridge body 18 includes a first surface or face 24 having first and second openings 26 and 28, respectively. The first opening 26 is configured to allow the leader 22 and tape 20 to pass therethrough. The second opening 28 is configured to receive the actuation member 14 of the tape drive 12 when the cartridge 10 is inserted into the tape drive 12.

The cartridge 10 further includes a first door 29 movably associated with the cartridge body 18, and a retractor member 30 attached to the cartridge body 18 and the first door 29 for moving the first door 29 relative to the cartridge body 18. In the embodiment shown in the Figures, the first door 29 is slidable along a channel 31 formed in the cartridge body 18 between an open position, shown in FIGS. 2 and 3, and a closed position, shown in FIG. 1, in which the first door 29 at least partially covers the first opening 26. Alternatively, the first door 29 may be configured to move in any suitable manner.

The first door 29 may also be provided with a boss or projection 32 that extends into an aperture 33 formed in the leader 22 when the first door 29 is in the closed position. With such a configuration, the first door 29 assists in holding the leader 22 in a stowed position shown in FIG. 1.

The retractor member 30 is configured to engage the actuation member 14 and to move the first door 29 to the open position when the cartridge 10 is inserted into the tape drive 12. In the embodiment shown in the Figures, the retractor member 30 includes a first portion 34 attached to the first door 29, and a second portion 36 attached to a fixed attachment location 38 on the cartridge body 18. In the embodiment shown in the Figures, the attachment location 38 comprises a rod or post about which the second portion 36 may pivot.

While the first and second portions 34 and 36 may be made of the same material or materials, in the embodiment shown in the Figures, the first portion 34 comprises a flexible material such as fabric or plastic, and the second portion 36 comprises a relatively rigid material such as metal or plastic. In one embodiment of the invention, for example, the first portion 34 may comprise a nylon based fabric, and the second portion 36 may comprise stainless steel. When the second portion 36 comprises a relatively rigid material, the second portion 36 may function as a second door that is pivotable between a closed position shown in FIG. 1, and an open position shown in FIGS. 2 and 3. In the closed position, the second portion 36 at least partially covers the second opening 28. In the open position, the second portion 36 allows the actuation member 14 to enter the interior of the cartridge 10.

Alternatively, the first and second portions 34 and 36, respectively, may have any suitable configuration. For example, both portions 34 and 36 may comprise a flexible material. With such a configuration, the second portion 36 may still pivot with respect to the cartridge body 18.

The cartridge 10 may further include a guide member 40, such as a post or roller, for bending the retractor member 30 as the retractor member 30 moves across the guide member 40. In addition, the cartridge 10 may be provided with a spring 42 for urging the first door 29 toward the closed position. In the embodiment shown in the Figures, one end of spring 42 is connected to the drive body 18, and an opposite end of spring 42 is connected to the first door 29.

Referring to FIG. 1, the tape drive 12 is configured to receive the cartridge 10 and to perform read and/or write operations on the tape 20. For example, the tape drive 12 may include a threading mechanism (not shown), such as a buckling mechanism, for engaging the leader 22 and for routing the leader 22 to a take-up reel (not shown). The tape drive 12 may then function to route the tape 20 across one or more read and/or write heads (not shown) for performing read and/or write operations on the tape 20.

The actuation member 14 may be mounted on any suitable portion of the tape drive 12. For example, the actuation member 14 may be fixed to a shuttle or elevator 44 that receives the cartridge 10 and moves the cartridge onto a drive hub (not shown) of the tape drive 12.

While the actuation member 14 may have any suitable configuration for engaging the retractor member 30, in the embodiment shown in the Figures, the actuation member 14 comprises a main body 46, such as a blade, and a roller 48 rotatably mounted on the main body 46. The roller 48 reduces friction and allows the retractor member 30 to travel smoothly across the actuation member 14.

Operation of the cartridge 10 and tape drive 12 will now be described. First, the cartridge 10 may be inserted into the tape drive 12, either manually or automatically. For example, the cartridge 10 may be inserted into the tape drive 12 in a first direction generally perpendicular to the first face 24. When the cartridge 10 is inserted into the tape drive 12, the actuation member 14 extends into the second opening 28 and engages the retractor member 30, thereby urging the second portion 36 of the retractor member 30 toward the open position. As a result, the second portion 36 pivots about the attachment location 38, thereby pulling the first portion 34 across the guide member 40 and urging the first door 29 toward the open position. With the configuration shown in the Figures, the first portion 34 also bends at the guide member 40 such that the retractor member 30 bends or folds about the actuation member 14.

Once the first door 29 is moved to the open position, the threading mechanism of the tape drive 12 may engage the leader 22 and route the leader 22 and the tape 20 to the take-up reel of the tape drive 12. For example, the threading mechanism may include a machine leader that is configured to extend through the first opening 26 and/or a third opening 50 formed in a second surface or face 52 of the cartridge body 18, and buckle to the leader 22 at aperture 33. In the embodiment shown in FIG. 1, the second face 52 of the cartridge body 18 extends at an angle with respect to the first face 24. For example, the second face 52 may be generally perpendicular to the first face 24. After connecting to the leader 22, the threading mechanism may route the leader 22 and tape 20 along a tape path (not shown) of the tape drive 12 to the take-up reel. Read and/or write operations may then be performed on the tape 20.

Advantageously, minimal cartridge movement is required during loading of the cartridge 10 into the tape drive 12 in order to open the first door 29. Because the retractor member 30 folds or bends about the actuation member 14, movement of the cartridge 10 a distance x after contacting the actuation member 14 may result in movement of the first door 29 a distance of approximately 2x.

Furthermore, because the actuation member 14 extends into the cartridge 10, the tape drive 12 may not accept cartridges that do not have an opening for receiving the actuation member 14. Thus, the actuation member 14 may function as a "keep out" mechanism for preventing undesired cartridges from being inserted into the tape drive 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape cartridge for use with a tape drive having an actuation member, the cartridge comprising:
   a cartridge body;
   a door movably associated with the cartridge body; and
   a retractor member having a first portion attached to the door and a second portion attached to the cartridge body such that the second portion is pivotable with respect to the cartridge body, the retractor member being configured to engage the actuation member of the tape drive and to move the door toward an open position when the cartridge body is inserted into the tape drive;
   wherein the retractor member is configured to fold about the actuation member when the cartridge body is inserted into the tape drive.

2. The cartridge of claim 1 wherein second portion of the retractor member comprises a pivotable door.

3. The cartridge of claim 1 wherein the second portion of the retractor member is attached to the cartridge body at a fixed attachment location on the cartridge body.

4. The cartridge of claim 1 wherein the cartridge body includes a first face having first and second openings, the first opening being configured to allow tape to pass therethrough, the second opening being configured to receive the actuation member of the tape drive when the cartridge body is inserted into the tape drive, and wherein the door is configured to at least partially cover the first opening when the door is in a closed position.

5. The cartridge of claim 4 wherein the second portion of the retractor member comprises a pivotable door that is pivotable between an open position and a closed position in which the pivotable door at least partially covers the second opening.

6. The cartridge of claim 1 further comprising a guide member for bending the retractor member when the cartridge body is inserted into the tape drive.

7. The cartridge of claim 1 further comprising a spring connected to the door for urging the door toward a closed position.

8. A tape cartridge for use with a tape drive having an actuation member, the cartridge comprising:
   a cartridge body including a first face having first and second openings, the first opening being configured to allow tape to pass therethrough, the second opening being configured to receive the actuation member of the tape drive when the cartridge body is inserted into the tape drive;
   a first door slidably associated with the cartridge body and movable between an open position and a closed position in which the first door at least partially covers the first opening;
   a second door pivotably associated with the cartridge body such that the second door is pivotable between an open position and a closed position in which the second door at least partially covers the second opening; and
   a flexible member attached to the first and second doors;
   wherein the second door is configured to engage the actuation member and to pivot with respect to the cartridge body when the cartridge body is inserted into the tape drive, thereby causing the first door to move toward the open position.

9. A tape cartridge for use with a tape drive having an actuation member, the cartridge comprising:
   a cartridge body;
   a door movably associated with the cartridge body; and
   a retractor member attached to the door and the cartridge body at an attachment location on the cartridge body, such that a portion of the retractor member extends between and is connected to the door and the attachment location, the retractor member being configured to engage the actuation member of the tape drive at a location on the portion of the retractor member between the door and the attachment location when the cartridge body is inserted into the tape drive, the retractor member further being configured to move the door toward an open position upon engagement with the actuation member.

10. The cartridge of claim 9 wherein the cartridge body includes a first face having first and second openings, the first opening being configured to allow tape to pass therethrough, the second opening being configured to receive the actuation member of the tape drive when the cartridge body is inserted into the tape drive, and wherein the door is configured to at least partially cover the first opening when the door is in a closed position.

11. The cartridge of claim 9 wherein the retractor member is configured to bend upon engagement with the actuation member.

12. The cartridge of claim 9 wherein the retractor member comprises a flexible material.

13. A tape cartridge and tape drive combination comprising:
   a tape cartridge including a cartridge body, a door movably associated with the cartridge body, and a retractor member having a first portion attached to the door and a second portion attached to the cartridge body, the cartridge body having an opening for providing access to the second portion of the retractor member; and
   a tape drive configured to receive the tape cartridge and including an actuation member that extends into the opening and engages the second portion of the retractor member when the tape cartridge is inserted into the tape drive;
   wherein the retractor member is configured to move the door toward an open position upon engagement with the actuation member, and wherein the cartridge body further comprises a guide member for bending the retractor member when the tape cartridge is inserted into the tape drive.

14. The combination of claim 13 wherein the second portion of the retractor member is configured to pivot upon engagement with the actuation member.

15. The combination of claim 14 wherein second portion of the retractor member comprises a pivotable door.

16. The combination of claim 13 wherein the retractor member folds about the actuation member when the tape cartridge is inserted into the tape drive.

17. The combination of claim 13 wherein the second portion of the retractor member is attached to the cartridge body at a fixed attachment location on the cartridge body.

18. The combination of claim 13 wherein the cartridge body has a first face that includes the opening and an additional opening spaced away from the opening, the additional opening being configured to allow tape to pass therethrough, and wherein the door is configured to at least partially cover the additional opening when the door is in a closed position.

19. The combination of claim 13 wherein the tape cartridge further comprises a spring connected to the door and the cartridge body for urging the door toward a closed position.

20. The combination of claim 13 wherein the second portion of the retractor member is attached to the cartridge body at an attachment location, and wherein the actuation member engages the retractor member between the door and the attachment location when the tape cartridge is inserted into the tape drive.

21. The combination of claim 13 wherein the actuation member of the tape drive includes a roller that is engageable with the retractor member.

22. A tape cartridge and tape drive combination comprising:
   a tape cartridge including a cartridge body, a door movably associated with the cartridge body, and a retractor member having a first portion attached to the door and a second portion attached to the cartridge body, the cartridge body having an opening for providing access to the second portion of the retractor member; and
   a tape drive configured to receive the tape cartridge and including an actuation member that extends into the opening and engages the second portion of the retractor member when the tape cartridge is inserted into the tape drive;
   wherein the retractor member is configured to move the door toward an open position upon engagement with the actuation member, and wherein the actuation member of the tape drive includes a roller that is engageable with the retractor member.

* * * * *